United States Patent
Ishikado et al.

(10) Patent No.: US 9,903,610 B2
(45) Date of Patent: Feb. 27, 2018

(54) EXHAUST CASE AND COMBUSTION APPARATUS PROVIDED WITH THE SAME

(71) Applicant: NORITZ CORPORATION, Hyogo (JP)

(72) Inventors: Masamitsu Ishikado, Hyogo (JP); Takehiro Shimizu, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 14/280,835

(22) Filed: May 19, 2014

(65) Prior Publication Data
US 2014/0345542 A1    Nov. 27, 2014

(30) Foreign Application Priority Data
May 24, 2013    (JP) ................. 2013-110406

(51) Int. Cl.
*F24H 1/12*    (2006.01)
*F23J 15/06*    (2006.01)
(Continued)

(52) U.S. Cl.
CPC ............ *F24H 1/124* (2013.01); *F23J 15/06* (2013.01); *F24H 1/40* (2013.01); *F24H 9/0026* (2013.01);
(Continued)

(58) Field of Classification Search
CPC ........ F24H 8/06; F24H 9/0026; F24H 9/0031; F24H 9/165
(Continued)

(56) References Cited

U.S. PATENT DOCUMENTS 6,662,758 B1 * 12/2003 Shin ........................ 122/18.1
7,458,340 B2 * 12/2008 Takeda et al. ............ 122/31.1
(Continued)

FOREIGN PATENT DOCUMENTS

JP    H02144366 U  * 12/1990
JP    04302910 A   * 10/1992
(Continued)

OTHER PUBLICATIONS

JP04302910A—machine translation.*
JP2006300405A—machine translation.*

*Primary Examiner* — Nathaniel Herzfeld
(74) *Attorney, Agent, or Firm* — Studebaker & Brackett PC

(57) ABSTRACT

An exhaust case having the first exhaust gas flow path for flowing combustion exhaust gas passing upward through a heat exchange, behind a water-shielding plate and for guiding the combustion exhaust gas onto the water-shielding plate toward an exhaust vent, and having the second exhaust gas flow path for flowing a part of combustion exhaust gas into a space between the water-shielding plate and a horizontal plate part and further into the exhaust vent. A ventilation hole is provided for an upright plate part extending from the rear end of the horizontal plate part in order to flow combustion exhaust gas into the space, and is provided in the substantially horizontal direction. Accordingly, the exhaust case is inhibited to become large scaled, and a superior exhaust noise-reduction effect, a suppression effect of combustion oscillation of the burner, and a waterproof performance are able to be achieved.

3 Claims, 3 Drawing Sheets

(51) Int. Cl.
*F24H 1/40* (2006.01)
*F24H 9/00* (2006.01)

(52) U.S. Cl.
CPC ............... *F23J 2900/11001* (2013.01); *F23J 2900/13003* (2013.01); *Y02E 20/363* (2013.01)

(58) Field of Classification Search
USPC .......... 122/18.4, 32, 18.1, 1 A, 7 R; 432/193
See application file for complete search history.

(56) References Cited

U.S. PATENT DOCUMENTS

| | | | |
|---|---|---|---|
| 2005/0039703 A1* | 2/2005 | Hur et al. ....................... | 122/32 |
| 2005/0039704 A1* | 2/2005 | Kobayashi et al. ............ | 122/32 |
| 2007/0204980 A1* | 9/2007 | Kim et al. ..................... | 165/172 |
| 2009/0288813 A1* | 11/2009 | Park .............................. | 165/169 |
| 2011/0155079 A1* | 6/2011 | Matsunaga ............... | F24H 1/40 |
| | | | 122/15.1 |

FOREIGN PATENT DOCUMENTS

| | | | |
|---|---|---|---|
| JP | H04-302910 A | | 10/1992 |
| JP | 2006300405 A | * | 11/2006 |
| JP | 2007232289 A | * | 9/2007 |
| JP | 2008032369 A | * | 2/2008 |

\* cited by examiner

EXHAUST CASE AND COMBUSTION APPARATUS PROVIDED WITH THE SAME

BACKGROUND OF THE INVENTION

Field of the Invention

The present invention relates to an exhaust case for exhausting combustion exhaust gas passing through a heat exchanger in a combustion apparatus such as an instantaneous water heating apparatus and to a combustion apparatus provided with the exhaust case.

Description of the Related Art

One example of an exhaust case is disclosed in the following Patent Literature 1 and the diagrammatical structure is shown in FIG. 4.

An exhaust case 9 shown in FIG. 4 is provided for guiding combustion exhaust gas passing upward through a heat exchanger 8, to an exhaust vent 90 and for exhausting the combustion exhaust gas outside. The exhaust case 9 includes the first and the second exhaust gas flow paths Ra, Rb. The first exhaust gas flow path Ra is formed by utilizing a water-shielding plate 91, guides combustion exhaust gas passing through the heat exchanger 8, behind the water-shielding plate 91 as shown with an arrow N11 and guides the combustion exhaust gas onto the water-shielding plate 91 toward the exhaust vent 90. The second exhaust gas flow path Rb is formed in such a manner that a lower plate 92 is provided under the water-shielding plate 91 in the forward area and a ventilation hole 93 is provided for the lower plate 92. Specifically, the lower plate 92 has a substantially horizontal plate part 92a and an upright plate part 92b extending from the rear end of the horizontal plate part 92a. A space 5e communicating with the exhaust vent 90 is formed between the horizontal plate part 92a and the water-shielding plate 91. The second exhaust gas flow path Rb guides a part of combustion exhaust gas passing through the heat exchanger 8, to the space 5e from the ventilation hole 93 and further to the exhaust vent 90.

In the above-mentioned structure, the combustion exhaust gas flowing in the exhaust case 9 diverges into the first exhaust gas flow path Ra and the second exhaust gas flow path Rb, thereby reducing exhaust noise. In addition, the above-mentioned structure suppresses combustion oscillation of the burner supplying combustion exhaust gas to the heat exchanger 8. Rain water entering the exhaust case 9 from the exhaust vent 90 is blocked by the water-shielding plate 91.

However, there is still a room for improvement in the related art as mentioned below.

Firstly, the ventilation hole 93 is provided for the horizontal plate part 92a of the lower plate 92 in the vertical direction. Therefore, combustion exhaust gas passes upward through the ventilation hole 93 and flows into the space 5e. The vertical width of the space 5e is small, so that the combustion exhaust gas hits the water-shielding plate 91 as soon as it passes through the ventilation hole 93 and a great deal of combustion exhaust gas bounces downward. Thus, the amount of combustion exhaust gas flowing into the space 5e from the ventilation hole 93 is easily reduced. In such a case, the advantageous effect of providing the second exhaust gas flow path Rb in addition to the first exhaust gas flow path Ra is reduced and a superior noise reduction effect and a suppression effect of combustion oscillation are hardly obtained. If the vertical width of the space 5e becomes remarkably large, the above-mentioned disadvantages can be partly resolved. Such a case is not appropriate because the exhaust case 9 becomes large.

Secondly, a front area 80 of the heat exchanger 8 is required to be positioned ahead of (left side in the figure) the ventilation hole 93 so as not to block the ventilation hole 93. Therefore, such a structure causes troubles in downsizing the heat exchanger 8 by reducing the width.

Thirdly, if rainwater enters the space 5e from the exhaust vent 90 for some reasons, the rain water easily flows into the ventilation hole 93. The rainwater flowing in the ventilation hole 93 enters where the heat exchanger 8 is placed, thereby causing corrosion of the heat exchanger. Prevention of such disadvantages is desired.

CITATION LIST

Patent Literature 1: Japanese unexamined patent publication No. H04-302910

SUMMARY OF THE INVENTION

An object of the present invention is to prevent or inhibit the above-mentioned defects.

The present invention proposes the following technical means for solving the above-mentioned problems.

An exhaust case proposed in the first aspect of the preset invention is provided with an exhaust case body provided to cover an upper opening of a heat exchanger and formed with an exhaust vent on the front part; a water-shielding plate extending from a forward area to a rear area in the exhaust case body; a first exhaust gas flow path provided in the exhaust case body, the first exhaust gas flow path guiding combustion exhaust gas passing upward through the heat exchanger, behind the water-shielding plate and further guiding the combustion exhaust gas onto the water-shielding plate toward the exhaust vent; a substantially horizontal plate part provided under a forward area of the water-shielding plate and having a space formed between the horizontal plate part and the water-shielding plate, the front area of the space communicating with the exhaust vent; an upright plate part extending from a rear end of the horizontal plate part to the water-shielding plate, the upright plate part having at least one ventilation hole provided in the substantially horizontal direction; and a second exhaust gas flow path guiding a part of combustion exhaust gas passing upward through the heat exchanger, to the space from the ventilation hole and further guiding the combustion exhaust gas to the exhaust vent.

Preferably, the height of the upright plate part in the vertical direction is equal to or less than the width of the horizontal plate part in the back and forth direction.

Preferably, the ventilation hole is provided upward from the vertical center of the upright plate part.

Preferably, the exhaust case of the preferred embodiment of the present invention is further provided with a dropping plate part dropping downward from the front end of the water-shielding plate. A gap is formed between the dropping plate part and the front end of the horizontal plate part and guides combustion exhaust gas flowing in the space to the exhaust vent, a flow path of the gap being less than that of the space in the area.

Preferably, the dropping plate part is positioned ahead of the horizontal plate part and the gap is provided in the vertical height direction so as to guide combustion exhaust gas flowing through the space, downward or obliquely downward.

Preferably, the exhaust case of the preferred embodiment of the present invention is further provided with a front plate part dropping downward from the front end of the horizontal plate part. The dropping plate part is provided with a plurality of supporting piece parts extending downward from the lower edge of the dropping plate part, the supporting piece parts being fixed to the front plate part.

Preferably, the horizontal plate part, the front plate part, and the upright plate part are integrally formed by press-working a single plate material.

Preferably, the exhaust case of the preferred embodiment of the present invention is further provided with an exhaust terminal having a tubular protruding piece part surrounding the periphery of the exhaust vent and mounted on the front part of the exhaust case body, wherein the lower part of the protruding piece part protrudes forward from the front plate part at a position lower than the gap.

A combustion apparatus proposed in the second aspect of the present invention is provided with a burner, a heat exchanger for recovering heat from combustion gas generated by the burner, and an exhaust case for guiding combustion exhaust gas passing through the heat exchanger, wherein the exhaust case as mentioned in the first aspect of the present invention is used.

Other characteristics and advantages of the present invention will be apparent in the following detailed description of the preferred embodiments referring to the attached drawings.

DETAILED DESCRIPTION OF THE PREFERRED EMBODIMENT

Preferred embodiments of the present invention are explained below with reference to the accompanying drawings.

Figure 1:
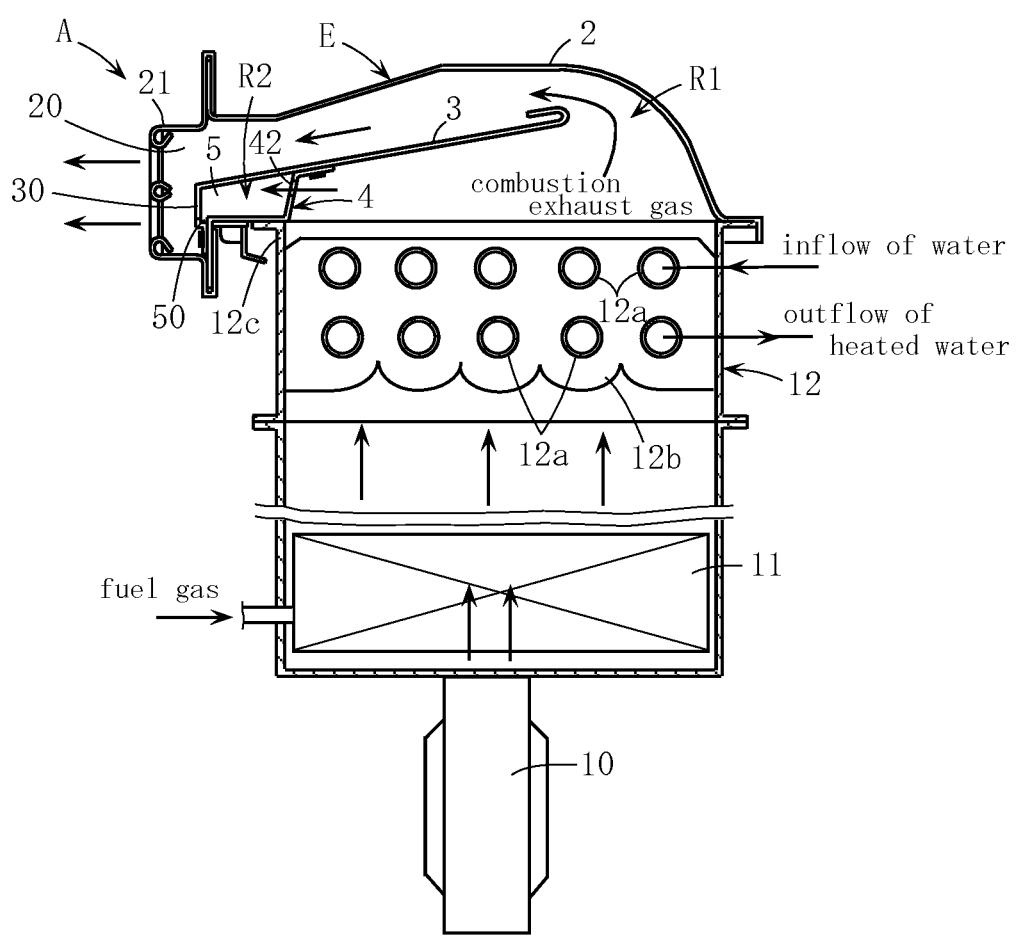
FIG. 1 is a diagrammatic sectional view showing one example of a combustion apparatus provided with an exhaust case of an embodiment of the present invention.
Figure 2:
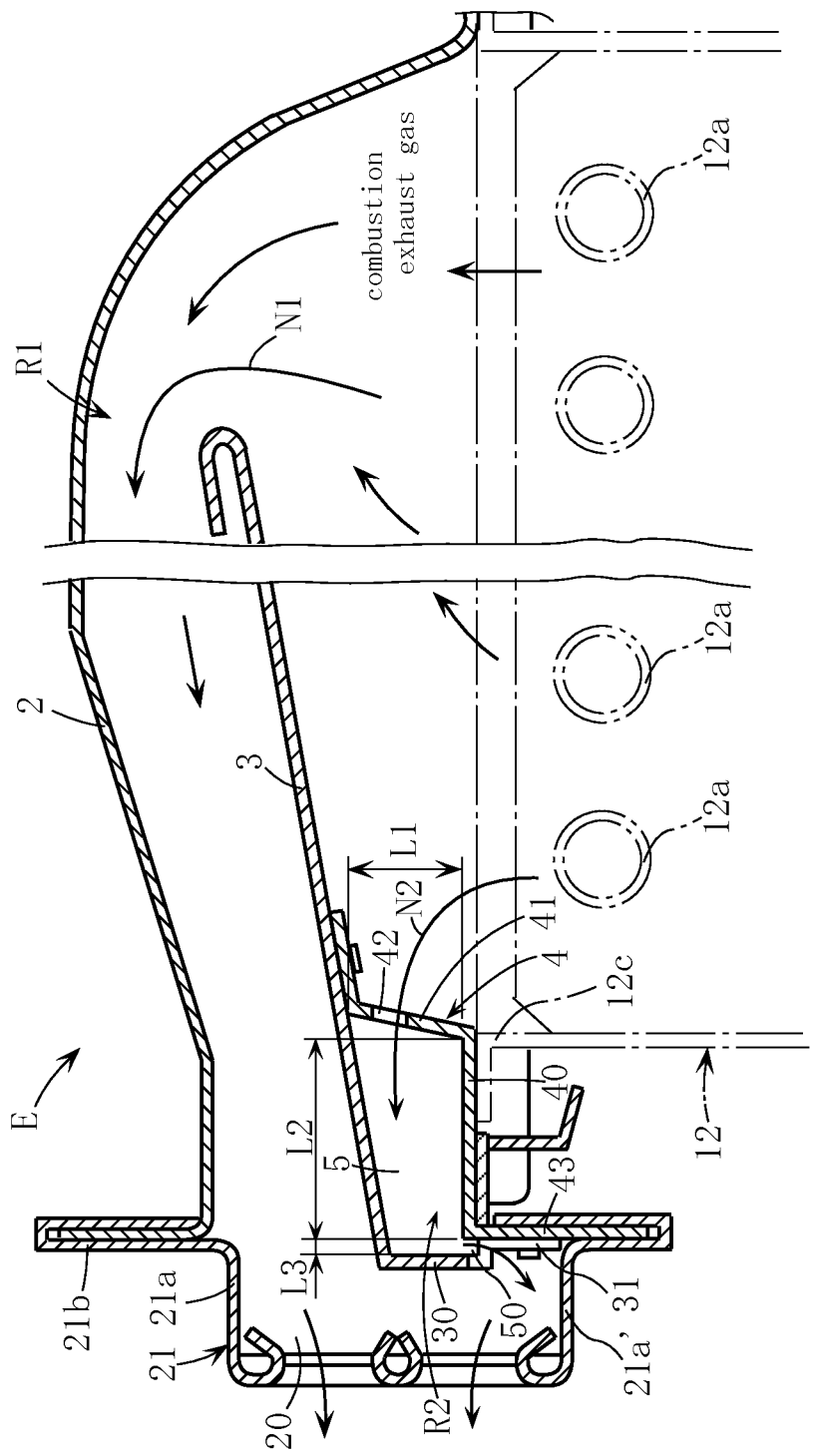
FIG. 2 is a diagrammatic sectional view of the exhaust case shown in FIG. 1.

The combustion apparatus A shown in FIG. 1 and FIG. 2 is constituted as a water heating apparatus. The combustion apparatus A is provided with a burner 11 for combusting fuel gas utilizing combustion air fed upward from a fan 10, a heat exchanger 12 arranged above the burner 11, and an exhaust case E arranged on the heat exchanger 12.

The heat exchanger 12 has a heat transfer tube 12a to which water is fed from outside and a fin 12b adjunct to the heat transfer tube 12a. The heat exchanger 12 heats water by recovering heat from the combustion gas generated by the burner 11. Heated water is discharged from the heat transfer tube 12a and supplied to an intended place. The heat transfer tube 12a and the fin 12b are made of copper, for example.

The exhaust case E has an exhaust case body 2, a water-shielding plate 3 and a lower board 4. The first exhaust gas flow path R1 and the second exhaust gas flow path R2, to be mentioned later, are provided in the exhaust case E as an exhaust gas flow path for guiding combustion exhaust gas passing upward through the heat exchanger 12, to the exhaust vent 20.

The exhaust case body 2 is hollow with its lower face open. The exhaust vent 20 is provided on the front part of (left side in the figures) the exhaust case body 2 utilizing an exhaust terminal 21. A sound-deadening member (not shown in the figures) can be attached to the inner wall of the exhaust case E.

The water-shielding plate 3 is provided in the exhaust case E so as to extend obliquely upward from the forward area to the rear area. A dropping plate part 30 crooked downward is provided on the front end of the water-shielding plate 3. A plurality of supporting piece parts 31 are provided on the lower edge of the dropping plate part 30 for supporting the dropping plate part 30 and are fixed to a front plate part 43 to be mentioned later. The water-shielding plate 3 prevents rain water passing through the exhaust vent 20 from flowing into the place where the heat exchanger 12 is provided. The water-shielding plate 3 also functions as a current plate for combustion exhaust gas. The first exhaust gas flow path R1 is provided in the exhaust case E so as to guide combustion exhaust gas passing upward through the heat exchanger 12, behind the water-shielding plate 3 as shown with the arrow N1 and to guide the combustion exhaust gas onto the water-shielding plate 3 toward the exhaust vent 20.

Figure 3:
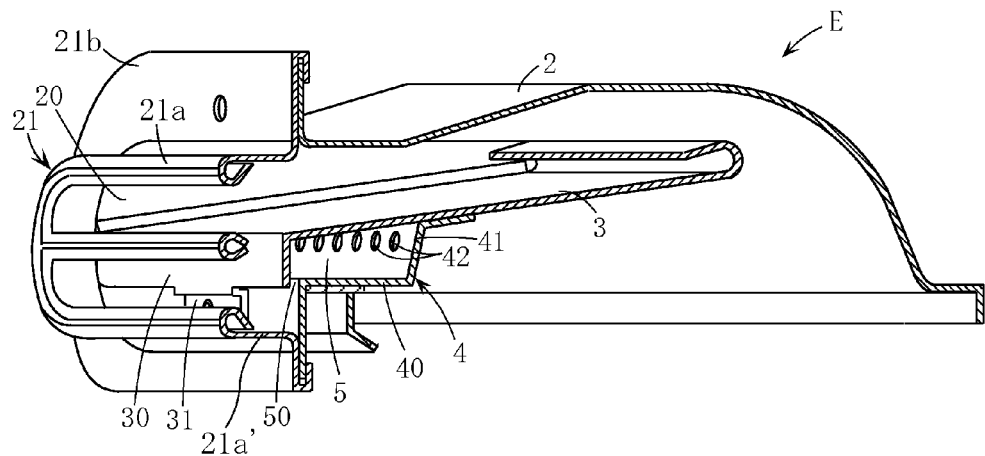
FIG. 3 is a sectional perspective view of the exhaust case shown in FIG. 1.
Figure 4:
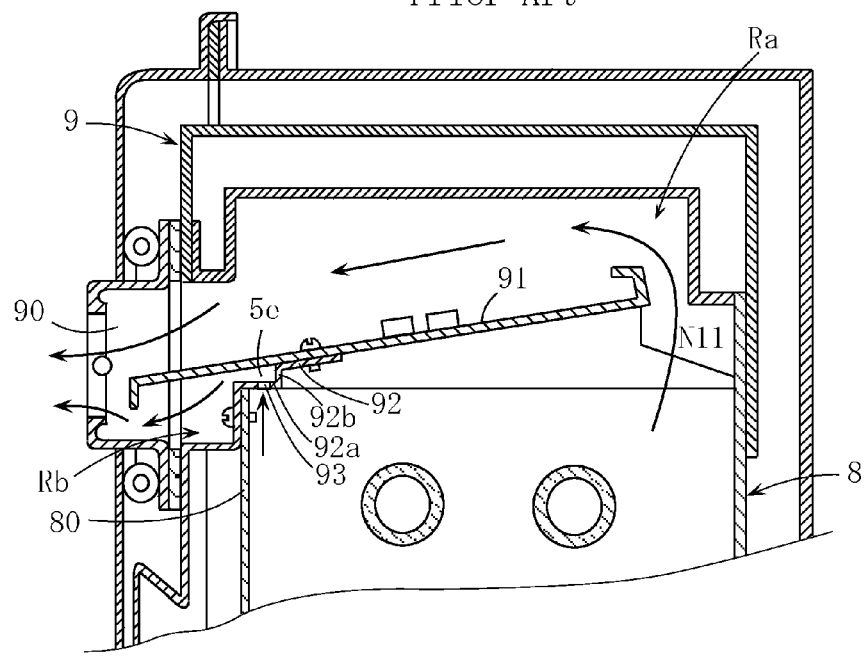
FIG. 4 is an essential diagrammatic sectional view showing one example of the related art.

The lower board 4 is produced by press-working of a stainless steel plate having the substantially same width as the water-shielding plate 3, the width being perpendicular to the sheet of the drawing. The lower board 4 is provided under the water-shielding plate 3 around the forward area thereof. The lower board 4 has a substantially horizontal plate part 40, an upright plate part 41 extending from the rear end of the horizontal plate part 40 to the water-shielding plate 3, and a front plate part 43 dropping downward from the front end of the horizontal plate part 40. The upright plate part 41 has a plurality of ventilation holes 42 provided in the horizontal direction at an appropriate interval (also refer to FIG. 3). The ventilation holes 42 are provided on the upper side of the upright plate part 41, namely the center of the ventilation hole 42 is positioned above that of the upright plate part 41 in the height direction.

A space 5 is formed between the horizontal plate part 40 and the water-shielding plate 3. The lower edge of the dropping plate part 30 is positioned at the substantially same height as the front of the horizontal plate part 40. A gap 50 with a relatively small width L3 is formed between the dropping plate part 30 and the horizontal plate part 40, and communicates with the exhaust vent 20. The exhaust case E includes the second exhaust gas flow path R2 in which a part of the combustion exhaust gas passing upward through the heat exchanger 12 flows into the space 5 through each ventilation hole 42 as shown with the arrow N2 and then reaches the exhaust vent 20 through the gap 50. The gap 50 has a smaller flow path than that of the space 5 in area (planar dimension) and is formed in the vertical height direction. The height L1 of the upright plate part 41 and the width L2 in the front and back direction of the horizontal plate part 40 is preferable that L1 is equal to or smaller than L2, and is more preferable that L1 is smaller than L2.

The exhaust terminal 21 has a flange part 21b to be attached to the front part of the exhaust case body 2 and a tubular protruding piece part 21a protruding forward from the flange part 21b and surrounding the periphery of the exhaust vent 20. A lower part 21a' of the protruding piece part 21a protrudes forward from the front plate part 43 at a position lower than the gap 50.

Next, function of the combustion apparatus A provided with the exhaust case E is explained.

The combustion exhaust gas passing upward through the heat exchanger 12 diverges into the first exhaust gas flow path R1 and the second exhaust gas flow path R2, flows together at the exhaust vent 20, and goes outside. The ventilation hole 42 is provided for the upright plate part 41 in the substantially horizontal direction, so that combustion exhaust gas does not hit the water-shielding plate 3 as soon as it passes through the ventilation hole 42 in contrast to the conventional art. Therefore, resistance is small when combustion exhaust gas flows into the ventilation hole 42, thereby facilitating flow of combustion exhaust gas into the space 5 through the ventilation hole 42. Thus, a relatively large amount of combustion exhaust gas is able to flow in the second exhaust gas flow path R2, thereby preventing deterioration of noise reduction effect which is caused when the amount of the combustion exhaust gas in the second exhaust gas flow path R2 is too small. The exhaust case E of the preferred embodiment of the present embodiment achieves a superior noise-reduction effect and a suppression effect of combustion oscillation of the burner 11.

In this embodiment, the width L2 in the back and forth direction of the horizontal plate part 40 is large and the space 5 extends in the back and forth direction. This embodiment is preferable for smoothly flowing combustion exhaust gas from the ventilation hole 42 to the space 5. When combustion exhaust gas flows in the second exhaust gas flow path R2, it expands while flowing into the space 5 through the ventilation hole 42 and contracts while passing through the gap 50. After passing through the gap 50, the combustion exhaust gas expands again. Therefore, noise reduction effect is achieved based on the same principle as a multi-expansion type silencer.

The ventilation hole 42 is provided for the upright plate part 41, so that the ventilation hole 42 is not falsely blocked even when the front area 12c of the heat exchanger 12 is positioned directly under the upright plate part 41. Therefore, the front area 12c of the heat exchanger 12 is able to be positioned backward as compared with the conventional art, thus downsizing the heat exchanger 12. The height L1 of the upright plate part 41 is equal to or smaller than the width L2 of the horizontal plate part 40 in the back and forth direction and is relatively small, thereby inhibiting large-sizing of the exhaust case E.

The water-shielding plate 3 is provided between the horizontal plate part 40 and the exhaust vent 20, so that rainwater entering the exhaust case E from the exhaust vent 20 does not usually flow onto the horizontal plate part 40. However, rain water may flow onto the horizontal plate part 40 through the gap 50 because of some reasons. The ventilation hole 42 is provided for the upright plate part 41, specifically at an upper position of the upright plate part 41 in this embodiment. Therefore, rain water does not flow into the ventilation hole 42 even when small amount of rain water stays on the horizontal plate part 40. In addition, rain water is prevented from passing through the ventilation hole 42 and flowing into the heat exchanger 12.

The present invention is not limited to the above-mentioned preferred embodiments. The specific configurations of the members of the exhaust case and the combustion apparatus of the present invention are freely designed within the intended scope of the present invention.

The combustion apparatus of the present invention is not limited to be used for a water heating apparatus and the specific configuration of the heat exchanger is not limited.

The invention claimed is:
1. An exhaust case comprising:
an exhaust case body provided to cover an upper opening of a heat exchanger and formed with an exhaust vent on a front part;
a water-shielding plate extending from a forward area to a rear area in the exhaust case body;
a dropping plate part downward from a front end of the water-shielding plate;
a lower board having an upright plate part and a horizontal plate part which are provided under the water-shielding plate,
the upright plate part rising in vertical height direction so as to extend without winding from a lower face of the water-shielding plate to an upper end of a forward part of the heat exchanger,
the horizontal plate part extending in a horizontal manner from a lower end of the upright plate part toward a front of the lower end, the lower end of the upright plate part being positioned on the upper end of the heat exchanger, the anteroposterior length of the horizontal plate part being larger than the vertical height of the upright plate part, a front end of the horizontal plate part being close to the dropping plate part;
a first exhaust gas flow path guiding a part of combustion exhaust gas passing the heat exchanger behind and onto the water-shielding plate; and
a second exhaust gas flow path guiding a part of combustion exhaust gas passing the heat exchanger under the water-shielding plate;
wherein
the second exhaust gas flow path includes a space of which front, rear, up and down parts are surrounded with the dropping plate part, the upright plate part, the water-shielding plate and the horizontal plate part,
the upright plate part has a plurality of ventilation holes opening in horizontal direction for flowing combustion exhaust gas into the space,
a gap is formed between the front end of the horizontal plate part and the dropping plate part so as to flow combustion exhaust gas in the space to the exhaust vent, a flow path of the gap being less than that of the space in the area, and
the combustion exhaust gas is compressed when flowing into the ventilation holes, expands when flowing into the space, is compressed again when flowing into the gap, and expands again after passing through the gap to thereby achieve a noise reduction effect.

2. The exhaust case as set forth in claim 1, wherein the plurality of ventilation holes are provided upward from the vertical center of the upright plate part.

3. A combustion apparatus, comprising:
a burner;
a heat exchanger for recovering heat from combustion exhaust gas generated by the burner; and
an exhaust case for guiding combustion exhaust gas passing through the heat exchanger,
wherein the exhaust case as set forth in claim 1 is used.

* * * * *